United States Patent [19]

Kuno

[11] Patent Number: 4,762,659
[45] Date of Patent: Aug. 9, 1988

[54] COIL ARRANGEMENT FOR NUCLEAR FUSION APPARATUS

[75] Inventor: Kazuo Kuno, Kobe, Japan

[73] Assignee: Mitsubishi Denki Kabushiki Kaisha, Japan

[21] Appl. No.: 866,401

[22] Filed: May 23, 1986

[51] Int. Cl.⁴ .............................................. G21B 1/00
[52] U.S. Cl. ...................................... 376/142; 174/32
[58] Field of Search .................. 376/142, 143; 174/32; 307/89

[56] References Cited

U.S. PATENT DOCUMENTS

| | | | |
|---|---|---|---|
| 2,403,349 | 7/1946 | Dolberg | 174/32 |
| 3,360,692 | 12/1967 | Kafka | 376/142 |
| 3,419,433 | 12/1968 | Slifer, Jr. | 174/32 |
| 3,461,218 | 8/1969 | Buchhold | 174/32 |
| 3,609,208 | 9/1971 | Winpisinger | 174/32 |

FOREIGN PATENT DOCUMENTS 59-7267  1/1984  Japan .

Primary Examiner—Deborah L. Kyle
Assistant Examiner—Richard L. Klein
Attorney, Agent, or Firm—Leydig, Voit & Mayer

[57] ABSTRACT

The coil arrangement of a nuclear fusion apparatus according to the present invention comprises a return conductor divided into two lines, one of which is connected to resistance-inductance adjuster. The resistance-inductance adjuster is adapted to adjust the current distribution, thereby considerably reducing the error magnetic field generated to improve the characteristic of plasma confinement.

6 Claims, 3 Drawing Sheets

COIL ARRANGEMENT FOR NUCLEAR FUSION APPARATUS

BACKGROUND OF THE INVENTION

The present invention relates to a coil arrangement for a nuclear fusion apparatus, and more particularly it relates a transition-feeder structure of the coil arrangement for a nuclear fusion apparatus.

A convention coil arrangement for a nuclear fusion apparatus is constructed as shown in FIGS. 1 and 2. In the figures, reference numeral 1 designates a coil conductor, numeral 2 a transition conductor between turns, numeral 3 a transition conductor between coil layers, and numeral 4 a feeder line.

A current flows through the coil conductor 1, but when it flows through the transition conductor between turns 2, transition conductor between coil layers 3 and feeder line 4, additional current components other than the current which flows through the coil conductor 1 are generated, since they are deviated from the direction of the arc of the coil. The additional current components generate error magnetic fields which are harmful in that they effect the confinement of plasma within the coil. It is clear that the smaller the loop area of the extra currents is, the smaller the error magnetic field becomes. It has been therefore conceived that the transition structure be changed.

FIG. 3 is a schematic diagram showing the mode of transition of the current flowing through the coil. In the figure, reference numeral 5 designates arrow indicating the direction of the current flowing through the coil, numeral 6 a transition current between coil layers, numeral 7 a transition current between coils, and numeral 8 a return conductor. As can be seen from the figure, the transition directions are reversed to each other as indicated by the arrow 6, so as to minimize the error magnetic field in the inner side of the coil in the vicinity of the plasma (not shown).

However, even with the conventional technique as shown in FIG. 3, there exists the possibility of the problem that current loops may remain and generate the error magnetic fields, since the error magnetic fields may not be cancelled out sufficiently. Furthermore, there exists the problem in the production of the coil arrangement due to the fact that the mode of transition between coil layers is complicated.

SUMMARY OF THE INVENTION

The present invention has been made in view of the problem as stated above and has for its object to provide a coil arrangement for a nuclear fusion apparatus in which current loop areas generated by transition current are practically reduced to substantially minimize the error magnetic fields, thereby making it possible to obtain a coil arrangement for a nuclear fusion apparatus in which characteristics of the plasma confinement are improved.

The present invention provides a coil arrangement for a nuclear fusion apparatus containing a plasma, the coil arrangment comprising a return conductor for a coil feeder line. The return conductor is divided into two lines. One of the lines is situated more closely to the plasma and is provided with a resistance-inductance adjustor.

The present invention also provides a coil arrangment comprising a coil body, a feeder line, and a return conductor. The feeder line and the return conductor are each coupled to the coil body. The feeder line supplies current to the coil body, and, after circulating through the coil body, the current passes through the return conductor. The return conductor is divided into first and second return lines, and the coil arrangement further comprises a resistance-inductance adjustor operatively connected to the first return line.

The resistance-inductance adjuster according to the present invention has a function to adjust the distribution of the current flowing through the divided return conductors, thereby to substantially minimize the error magnetic field generated in a portion of the feeder line and a portion of the transition of the coil.

BRIEF DESCRIPTION OF THE DRAWINGS

In the figures, the same reference numerals denote the same or corresponding parts.

DESCRIPTION OF THE PREFERRED EMBODIMENTS

The present invention will be readily clear from the following embodiments taken in conjunction with the accompanying drawings.

Figure 1:
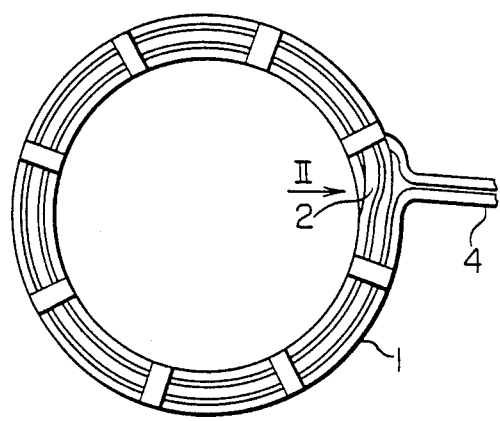
FIG. 1 is a plan view of an embodiment of a conventional coil arrangement.
Figure 2:
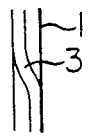
FIG. 2 is a side view of a part of the coil arrangement taken from II of FIG. 1.
Figure 3:
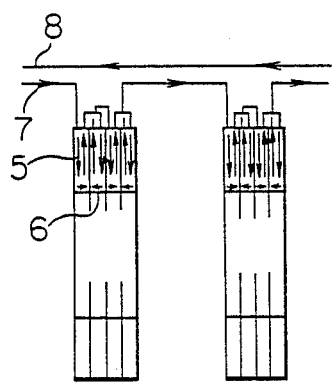
FIG. 3 is a sectional view of another embodiment of the conventional coil arrangement for a nuclear fusion apparatus.
Figure 4:
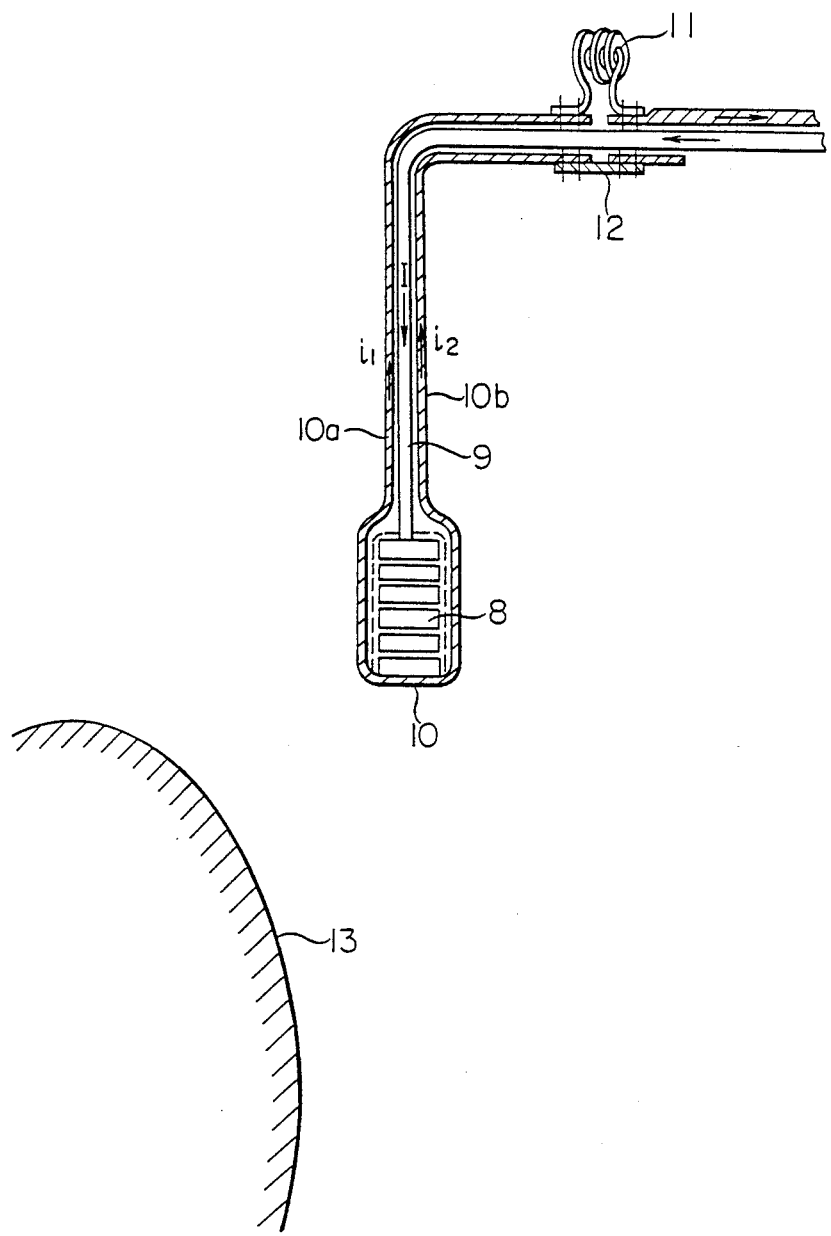
FIG. 4 is a sectional view showing a structure of the coil arrangement and feeder line of one embodiment of the coil arrangement for a nuclear fusion apparatus according to the present invention.

The present invention is characterized by a construction of the feeder line. Referring to FIG. 4, a going conductor 9 of the feeder line for supplying the coil body 8 with current comprises one line, while a return conductor 10 through which the current passes after circulation in the coil body 8 is divided into two lines 10a, 10b, one of which is connected to a resistance-inductance adjuster 11 disposed on the outer side of the coil body 8. Reference numeral 12 designates a short-circuit plate 12 connected to a portion of the return conductor 10b and numeral 13 plasma.

The current supplied through the going conductor 9 of the feeder line flows through the coil body 8 and is divided into portions 10a, 10b of the return conductor 10 disposed on both sides of the going conductor 9.

Figure 5:
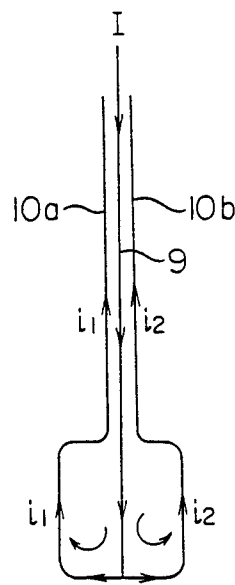
FIG. 5 is a schematic diagram showing the current flowing through the coil arrangement of FIG. 4.

FIG. 5 shows schematically the feeder line causing the generation of the error magnetic field and the transition current between turns within the coil arrangement, while neglecting the current flowing through the coil body 8, namely the portion generating the normal magnetic field in the coil arrangement of FIG. 4. If the current i1 and i2 divided by the return conductor portions 10a and 10b are equal, the magnetic fields generated by the current loops having i1 and i2 are equal in the loop areas thereof, and they are opposite to each other, so that they cancel out each other. However, as the clockwise current loop of the current i1 is physically situated more closely to the plasma 13 (refer to FIG. 4), the magnetic field generated in the plasma region is a little more dependent on the current i1 than the current i2, so that there remains a difference between the magnetic fields generated by the currents i1 and i2 as an error magnetic field. Therefore, the return conductor is provided along the middle portion thereof with a resistance-inductance adjuster 11 for adjusting the distribution of the current so as to completely cancel out the error magnetic field. The resistance-inductance adjuster 11 is mounted on an outer portion of the coil body, so that it becomes easier to adjust and replace it.

Figure 7:
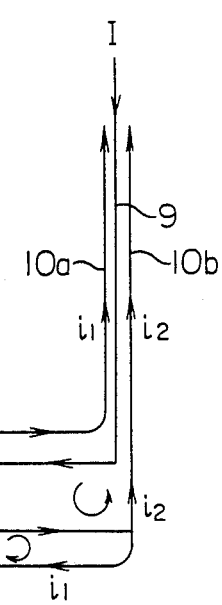
FIG. 7 is a schematic diagram showing the current flowing through the coil arrangement of FIG. 6.
Figure 6:
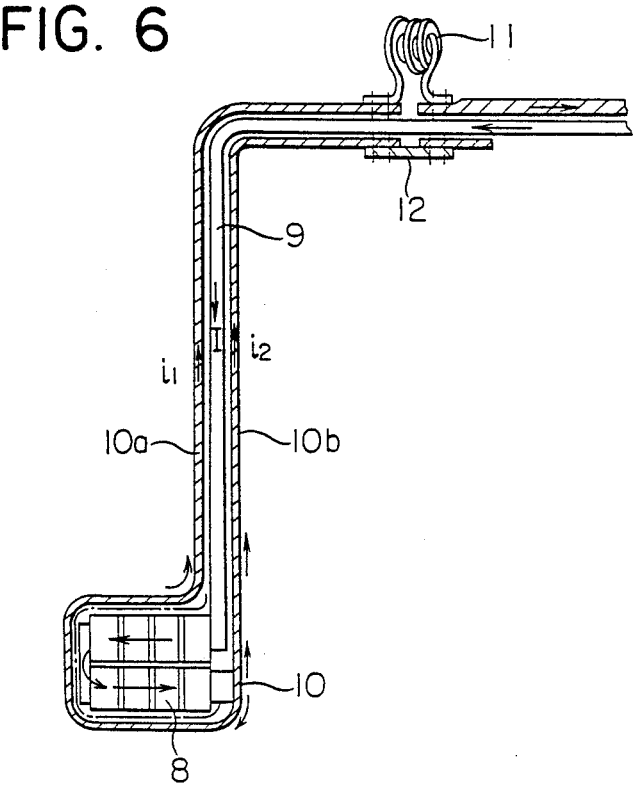
FIG. 6 is a sectional view of a double layer coil arrangement.

FIGS. 6 and 7 show another embodiment of a double layer coil where FIG. 6 is a sectional view of the same and FIG. 7 shows schematically the current flowing through the coil. The current is quite differently distributed in comparison with the single layer coil, since the shape and the area of loops by the currents i1 and i2 are different from the single layer coil. The error magnetic field can be cancelled out in the same manner as in the case of FIGS. 4 and 5.

The distribution of the current is preset according to the calculation and can be appropriately adjusted in accordance with the measurement of the magnetic field after the production of the coil arrangement.

The foregoing explanation has been devoted to the single layer and double layer coils, but the above stated technique can be applied to any multiple layer coil. Even when a plurality of coils are connected in series, a resistance-inductance adjuster may be provided on transition lines between coils to perform the same effect as that stated above.

Thus, according to the present invention, the return conductor of the coil feeder line is divided into two lines, one of which is provided with a resistance-inductance adjuster, thereby providing a coil arrangement for a nuclear fusion apparatus in which the generation of the error magnetic field is considerably reduced and the characteristic of the plasma confinement is improved.

What is claimed is:

1. In a nuclear fusion apparatus containing a plasma, a coil arrangement comprising:
   a return conductor for a coil feeder line, said return conductor being divided into two lines, one of which is situated more closely to the plasma and provided along a portion thereof with a resistance-inductance adjustor whereby the magnetic fields generated by the current flowing through the two return lines are opposite in direction to each other so as to cancel out the error magnetic field.

2. A coil arrangement for a nuclear fusion apparatus according to claim 1, wherein said adjuster is provided on an outer portion of a coil body.

3. In a nuclear fusion apparatus which can contain a plasma, a coil arrangement comprising:
   a coil body;
   a feeder line which is coupled to the coil body and which supplies current to the coil body;
   a return conductor which is coupled to the coil body and through which the current passes after circulation in the coil body, the return conductor being divided into first and second return lines; and
   a resistance-inductance adjustor operatively connected to the first return line.

4. The coil arrangement of claim 3 wherein the first return line is disposed closer to the plasma than the second return line.

5. The coil arrangement of claim 3 wherein the first and second return lines form first and second current loops having identical shapes and equal areas.

6. The coil arrangement of claim 3 wherein the first and second return lines form first and second current loops having different shapes and areas.

* * * * *